Feb. 5, 1924.                                      1,482,880
B. D. BARTON
POWER ATTACHMENT FOR MOTOR VEHICLES
Filed Nov. 11, 1922         2 Sheets-Sheet 1
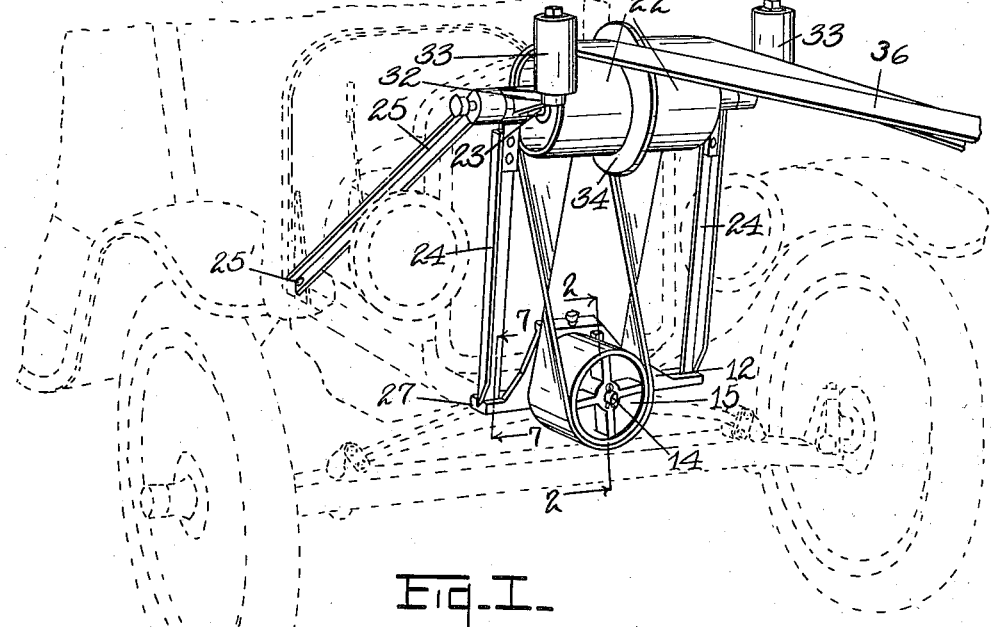
Fig. I.
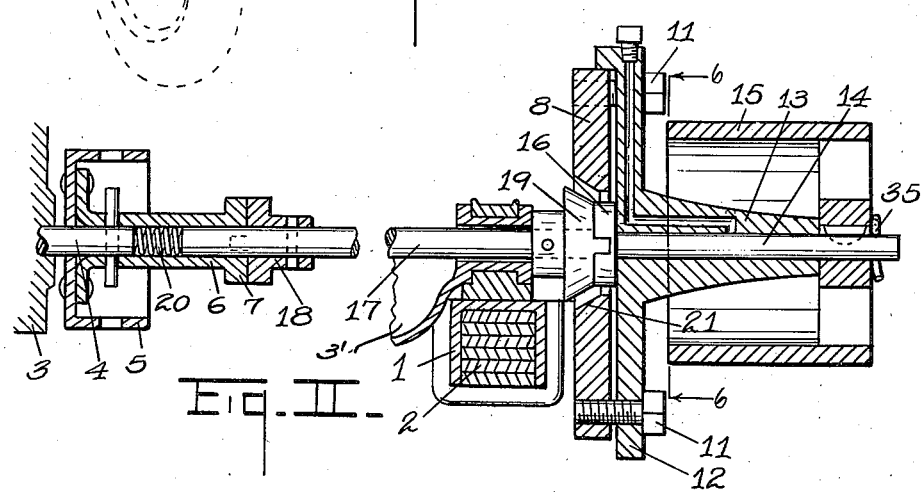
Fig. II.
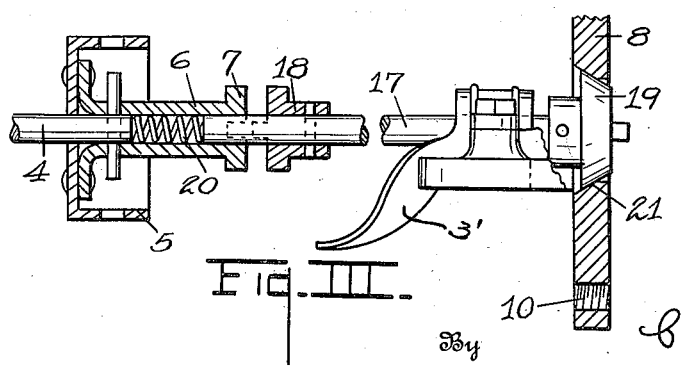
Fig. III.
Inventor
Ben. D. Barton
By Chappell & Earl
Attorneys Feb. 5, 1924.
B. D. BARTON
1,482,880
POWER ATTACHMENT FOR MOTOR VEHICLES
Filed Nov. 11, 1922    2 Sheets-Sheet 2
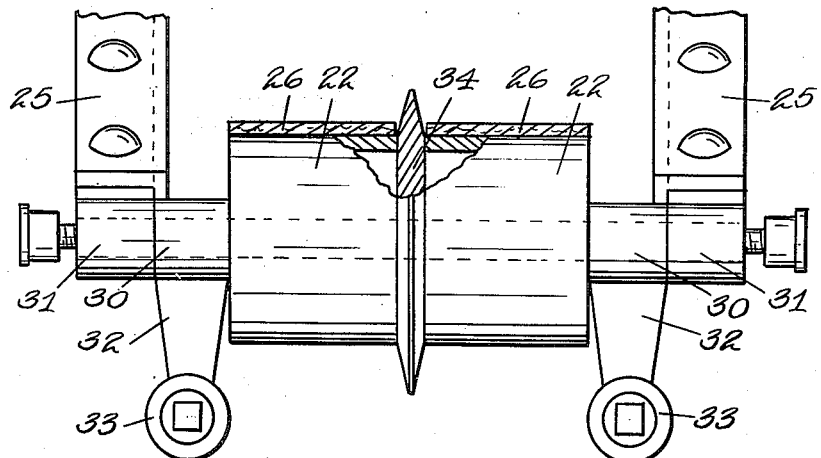
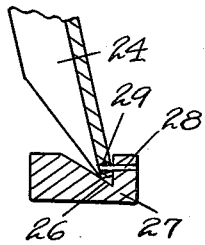
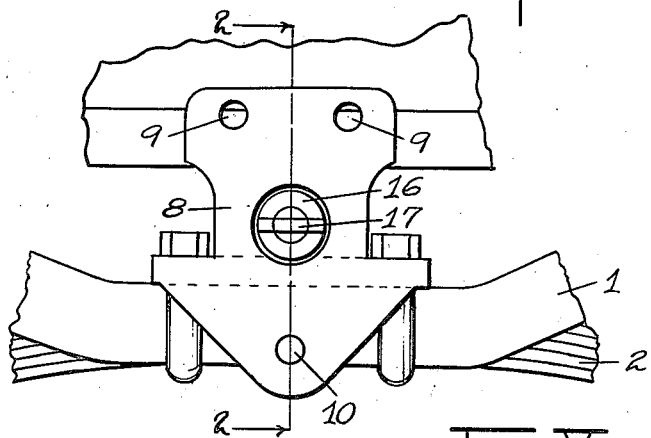
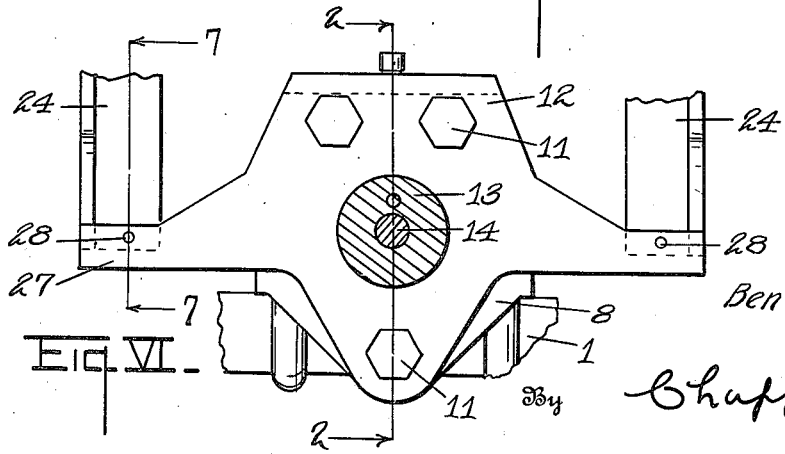
Inventor
Ben D. Barton
By Chappell & Earl
Attorneys Patented Feb. 5, 1924.

1,482,880

UNITED STATES PATENT OFFICE.

BEN D. BARTON, OF JACKSON, MICHIGAN.

POWER ATTACHMENT FOR MOTOR VEHICLES.

REISSUED

Application filed November 11, 1922. Serial No. 600,460.

*To all whom it may concern:*

Be it known that I, BEN D. BARTON, citizen of the United States, residing at the city and county of Jackson, State of Michigan, have invented certain new and useful Improvements in Power Attachments for Motor Vehicles, of which the following is a specification.

This invention relates to improvements in power attachments for motor vehicles.

The main objects of this invention are:

First, to provide an improved power attachment for motor vehicles which may be readily mounted upon a vehicle.

Second, to provide an improved power attachment for motor vehicles in which the parts are so arranged that the strain or pull of the driving belt is largely carried or sustained by the attachment, thereby avoiding the racking of the vehicle to which the attachment is applied.

Third, to provide an improved power attachment for motor vehicles which enables a direct drive from the driving shaft of the motor.

Fourth, to provide an improved power attachment for vehicles in which the parts are formed and arranged so that they may be knocked down or disassembled for convenience in transportation and handling.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a front perspective view of my improved power attachment shown in operative position upon a motor vehicle of well-known type, parts of the outline of the vehicle being indicated by dotted lines.

Fig. II is a detail view, partly in vertical longitudinal section, on a line corresponding to line 2—2 of Figs. I, V and VI.

Fig. III is a similar fragmentary sectional view with the driving pulley supporting frame removed.

Fig. IV is a fragmentary plan view partially in section to better illlustrate structural details.

Fig. V is a fragmentary front elevation with the driving pulley supporting frame removed.

Fig. VI is a detail section on a line corresponding to line 6—6 of Fig. II.

Fig. VII is a detail section on a line corresponding to line 7—7 of Figs. I and VI showing details of the frame and the manner of assembling and disassembling the same.

In the drawings the sectional views are taken looking in the direction of the little arrows at the ends of the section lines and similar reference characters refer to similar parts throughout the several views.

Referring to the drawing, 1 represents a cross member of the chassis frame and 2 the front spring thereof. The engine body is represented at 3 (see Fig. II) and the driving shaft at 4. In practice I remove the fan belt pulley with which the machine is usually equipped and substitute the fan belt pulley 5 having a forwardly projecting sleeve-like hub 6 terminating in the jaw clutch member 7. I also substitute a plate-like bracket 8 for a bracket usually employed to support the forward end of the cranking spindle, the cranking spindle being also removed. The bracket 8 has a flat face and an inwardly projecting arm-like portion which rests upon the frame member 1 and is clamped thereto by U-bolts as illustrated, the bracket projecting upwardly above the frame member as shown in Fig. V.

The bracket 8 is provided with holes 9 and 10 adapted to receive attaching bolts 11 of the pulley supporting frame 12 so that this pulley supporting frame is detachably secured to the bracket 8, it being intended that the bracket 8 shall remain in place and the supporting frame 12 being attached or removed as may be desired.

The frame 12 is provided with a bearing 13 for the spindle 14 of the driving pulley 15. This spindle is disposed longitudinally of the vehicle and in alignment with the driving shaft 4. The spindle is provided with a jaw clutch member 16 at its inner end.

The shaft 17 is provided with a clutch member 18 connecting with the clutch member 7 and with a clutch member 19 coacting with the clutch member 16. This shaft 17 is a floating shaft; that is, it is mounted for axial movement being held yieldingly outward by the coiled spring 20 arranged in the hub or sleeve 6 to disengage the clutch members 7 and 18 and being held with all of the clutch members in engagement when the pulley supporting frame is mounted on the bracket as shown in Fig. II.

The bracket 8 is provided with a conical or outwardly tapered opening 21 while the clutch member 19 has a conical periphery adapted to engage this tapered opening when the frame 12 is removed, thereby preventing rattling of the parts.

I provide a pair of idler pulleys 22 which are carried by the shaft 23 supported above and transversely to the driving pulley by means of the uprights 24 and the braces 25. These uprights rest in seats 26 provided therefor in the arms 27 of the supporting frame 12, the arms being provided with pins 28 adapted to engage holes 29 in the lower ends of the uprights, the uprights being engageable and disengageable with a tilting and swinging movement. This prevents the uprights jarring off the arms.

At the upper ends of the uprights are bearings 30 for the shaft 23. The braces 25 terminate in boxes 31 adapted to receive the ends of the shaft. The inner ends of the braces 25 are engaged with hooks or projections 25' on the chassis frame. The bearings 30 have forwardly projecting arms 32 carrying the upright guide pulleys 33. The guide disk 34 is disposed between the pulleys with its tapered periphery projecting beyond the same. This guide disk is freely rotatable in either direction.

The spindle of the pulley 15 is provided with a cross pin 35 with which a suitable crank may be engaged for cranking the engine should that be desired or necessary. The same crank is also designed to be engaged with the clutch member 19 when the power mechanism is removed. The engine 3 is provided with a forwardly projecting hanger member 3' which is engaged with the supporting bracket 8, see Figs. II and III, so that the supporting bracket performs the double function of supporting the driven part and also of an engine hanger support.

With this arrangement of parts the power mechanism may be quickly and easily applied to the motor vehicle or automobile and in operation there is little stress upon the parts. The belt 36 is supported and guided to very effectively deliver the power.

I have illustrated and described my invention in an embodiment which I have found very practical and as I have adapted the same for automobiles or pleasure vehicles, I have not attempted to illustrate and describe my improvements with such modifications as might be necessary or desirable for attaching them to trucks and tractors as I believe the disclosure made will enable those skilled in the art to which my invention relates to embody or adapt the same as may be desired.

Having thus described my invention what I claim as new and desire to secure by Letters Patent is:

1. The combination in a structure of the class described, of a chassis frame provided with a front cross member, a supporting bracket secured to said front cross member, a pulley supporting frame having a longitudinally disposed pulley spindle bearing and laterally projecting arms detachably secured to said bracket, a belt, a driving pulley provided with a spindle disposed in said bearing, a driving shaft, a clutch connection for said shaft and spindle comprising jaw clutch members on said shaft and spindle and an axially movable clutch member shaft having jaw clutch members thereon coacting with the clutch members of said driving shaft and spindle, the clutch members being held in engagement when said pulley supporting frame is mounted on said bracket, a spring for yieldingly holding said clutch member shaft in its clutch disengaging position when said pulley supporting frame is removed, a pair of idler pulleys, a shaft therefor disposed above and transversely of said driving pulley, idler shaft supporting uprights detachably engaged with said arms and provided with bearings for said idler shaft, and disengageable braces connecting said idler pulley shaft to said chassis frame.

2. The combination in a structure of the class described, of a chassis frame provided with a front cross member, a supporting bracket secured to said front cross member, a pulley supporting frame having a longitudinally disposed pulley spindle bearing detachably mounted on said bracket, a belt, a driving pulley provided with a spindle disposed in said bearing, a driving shaft, a clutch connection for said shaft and spindle comprising jaw clutch members on said shaft and spindle and an axially movable clutch member shaft having jaw clutch members thereon coacting with the clutch members of said driving shaft and spindle, the clutch members being held in engagement when said pulley supporting frame is mounted on said bracket, and a spring for yieldingly holding said clutch member shaft in its clutch disengaging position when said pulley supporting frame is removed.

3. The combination in a structure of the class described, of a chassis frame provided with a front cross member, a supporting bracket secured to said front cross member and having an outwardly tapered opening therein, a pulley supporting frame having a longitudinally disposed pulley spindle bearing detachably mounted on said bracket, a belt, a driving pulley provided with a spindle disposed in said bearing, a driving shaft, a clutch connection for said shaft and spindle comprising jaw clutch members on said shaft and spindle and an axially movable clutch member shaft having jaw movable clutch member shaft having jaw clutch members thereon coacting with the clutch members of said driving shaft and spindle, the clutch members being held in engagement when said pulley supporting frame is mounted on said bracket, and a spring for yieldingly holding said clutch member shaft in its clutch disengaging position when said pulley supporting frame is removed, the clutch member at the outer end of said clutch member shaft having a conical periphery engaging said tapered opening in said bracket when the clutches are disengaged.

4. The combination in a structure of the class described, of a chassis frame provided with a front cross member, a supporting bracket secured to said front cross member and having an outwardly tapered opening therein, a pulley supporting frame having a longitudinally disposed pulley spindle bearing detachably mounted on said bracket, a driving pulley provided with a spindle disposed in said bearing, a driving shaft, a fan belt pulley secured to said driving shaft and having an outwardly projecting sleeve-like hub terminating in a clutch jaw, an axially movable shaft disposed with its inner end slidable in said hub and provided with a clutch member coacting with the clutch member on said hub, a spring disposed in said hub adapted to normally disengage said clutch members, a clutch member on said pulley spindle, and a clutch member on said axially movable shaft coacting therewith, said clutch members being held in engagement when the pulley supporting frame is mounted on said bracket, the clutch member at the outer end of said axially movable shaft having a conical periphery which is held in engagement with said tapered opening in said bracket when the pulley supporting frame is removed.

5. The combination in a structure of the class described, of a chassis frame provided with a front cross member, a supporting bracket secured to said front cross member, a pulley supporting frame having a longitudinally disposed pulley spindle bearing detachably mounted on said bracket, a driving pulley provided with a spindle disposed in said bearing, a driving shaft, a fan belt pulley secured to said driving shaft and having an outwardly projecting sleeve-like hub terminating in a clutch jaw, an axially movable shaft disposed with its inner end slidable in said hub and provided with a clutch member coacting with the clutch member on said hub, a spring disposed in said hub adapted to normally disengage said clutch members, a clutch member on said pulley spindle, and a clutch member on said axially movable shaft coacting therewith, said clutch members being held in engagement when the pulley supporting frame is mounted on said bracket.

6. The combination in a structure of the class described, of a chassis frame, a supporting bracket mounted on said frame and having an outwardly tapered opening therein, a pulley supporting frame having a longitudinally disposed pulley spindle bearing detachably mounted on said bracket, a driving pulley provided with a spindle disposed in said bearing, a driving shaft, a clutch connection for said shaft and spindle comprising jaw clutch members on said shaft and spindle and an axially movable clutch member shaft having jaw clutch members thereon coacting with the clutch members of said driving shaft and spindle, the clutch members being held in engagement when members being held in engagement when said pulley supporting frame is mounted on said bracket, and a spring for yieldingly holding said clutch member shaft in its clutch disengaging position when said pulley supporting frame is removed, the clutch member at the outer end of said clutch member shaft having a conical periphery engaging said tapered opening in said bracket when the clutches are disengaged.

7. The combination in a structure of the class described, of a chassis frame, a supporting bracket mounted on said frame, a pulley supporting frame having a longitudinally disposed pulley spindle bearing detachably mounted on said bracket, a driving pulley provided with a spindle disposed in said bearing, a driving shaft, a clutch connection for said shaft and spindle comprising jaw clutch members on said shaft and spindle and an axially movable clutch member shaft having jaw clutch members thereon coacting with the clutch members of said driving shaft and spindle, the clutch members being held in engagement when said pulley supporting frame is mounted on said bracket, and a spring for yieldingly holding said clutch member shaft in its clutch disengaging position when said pulley supporting frame is removed.

8. The combination in a structure of the class described, of a chassis frame, a supporting bracket mounted on said frame, a pulley supporting frame detachably secured to said bracket, a driving pulley mounted on said pulley supporting frame, a driving shaft, and a driving connection for said shaft and pulley comprising clutch members which are engaged by the mounting of said pulley supporting frame upon said bracket.

9. The combination in a structure of the class described, of a chassis frame, a supporting bracket mounted on said frame, a driving shaft, a driving member, a supporting frame for said driving member detachably secured to said bracket, and a driving connection for said shaft and driving member engaged by the mounting of said supporting frame upon said bracket.

10. The combination in a structure of the class described, of a chassis frame, a supporting bracket mounted on said frame, a driving shaft, a driving member, a supporting frame for said driving member removably mounted on said bracket, and a clutch connection for said shaft and driving member comprising a longitudinally movable clutch member arranged to be engaged by the mounting of said supporting frame upon said bracket.

11. The combination in a structure of the class described, of a chassis frame, a supporting bracket mounted on said frame, a pulley supporting frame having laterally projecting arms detachably secured to said bracket, a driving pulley mounted on said pulley supporting frame, a driving shaft, a clutch connection for said shaft and driving pulley, an idler pulley shaft disposed above and transversely of said driving pulley, supporting uprights for said idler shaft detachably engaged with said arms and having bearings for said idler shaft, and disengageable braces connecting said idler pulley shaft to said frame.

12. The combination in a structure of the class described, of a chassis frame, a supporting bracket mounted on said frame, a pulley supporting frame having laterally projecting arms detachably secured to said bracket, a driving pulley carried by said pulley supporting frame, an idler shaft disposed above and transversely of said driving pulley, idler shaft supporting uprights detachably engaged with said arms and having bearings for said idler shaft, and braces connecting said idler shaft to said chassis frame.

13. The combination in a structure of the class described, of a chassis frame, a supporting bracket mounted on said frame, a pulley supporting frame having laterally projecting arms detachably secured to said bracket, a driving pulley carried by said pulley supporting frame, an idler shaft disposed above and transversely of said driving pulley, and idler shaft supporting uprights detachably engaged with said arms and having bearings for said idler shaft.

In witness whereof, I have hereunto set my hand and seal.

BEN D. BARTON. [L. S.]

Witnesses:
W. C. BEACH,
HARLOW BOYD.